(12) United States Patent
Jiang et al.

(10) Patent No.: US 9,267,667 B2
(45) Date of Patent: Feb. 23, 2016

(54) KIND OF OPTICAL LENS AND A KIND OF MINER'S HELMET LAMP

(71) Applicants: Wenda Jiang, Hong Kong (CN); Jinbo Jiang, Hong Kong (CN)

(72) Inventors: Wenda Jiang, Hong Kong (CN); Jinbo Jiang, Hong Kong (CN)

(73) Assignee: Huizhou Light Engine Limited, Guangdong (CN)

( * ) Notice: Subject to any disclaimer, the term of this patent is extended or adjusted under 35 U.S.C. 154(b) by 53 days.

(21) Appl. No.: 14/003,829

(22) PCT Filed: Mar. 5, 2013

(86) PCT No.: PCT/CN2013/072170
§ 371 (c)(1),
(2) Date: Sep. 9, 2013

(87) PCT Pub. No.: WO2014/008762
PCT Pub. Date: Jan. 16, 2014

(65) Prior Publication Data
US 2015/0043222 A1    Feb. 12, 2015

(30) Foreign Application Priority Data
Jul. 13, 2012  (CN) .......................... 2012 1 0243822

(51) Int. Cl.
| | |
|---|---|
| *F21V 5/00* | (2015.01) |
| *F21V 13/04* | (2006.01) |
| *F21V 5/04* | (2006.01) |
| *F21L 4/00* | (2006.01) |
| *F21V 7/00* | (2006.01) |
| *G02B 19/00* | (2006.01) |
| *G02B 3/08* | (2006.01) |
| *A42B 3/04* | (2006.01) |
| *F21V 5/02* | (2006.01) |
| *F21Y 101/02* | (2006.01) |

(52) U.S. Cl.
CPC ............... *F21V 13/045* (2013.01); *A42B 3/044* (2013.01); *F21L 4/00* (2013.01); *F21V 5/02* (2013.01); *F21V 5/04* (2013.01); *F21V 7/0091* (2013.01); *G02B 3/08* (2013.01); *G02B 19/0028* (2013.01); *G02B 19/0061* (2013.01); *F21Y 2101/02* (2013.01)

(58) Field of Classification Search
CPC ......... F21V 13/045; F21V 5/02; F21V 5/045; F21V 5/046; A42B 3/044
USPC .............................................................. 362/327
See application file for complete search history.

(56) References Cited

U.S. PATENT DOCUMENTS

| | | | |
|---|---|---|---|
| 2002/0085390 A1* | 7/2002 | Kiyomoto et al. | 362/555 |
| 2007/0159847 A1* | 7/2007 | Li | F21V 7/0091 362/606 |

*Primary Examiner* — Andrew Coughlin
(74) *Attorney, Agent, or Firm* — Schiff Hardin LLP (57) ABSTRACT

The embodiments of the present invention provide a kind of optical lens and a kind of miner's helmet lamp. A kind of optical lens, comprising a reflective surface and a light exit surface; wherein, in a circle with the central position of the said reflective surface as its center, at least a light distribution camber and a reflective camber are set up along the radius direction of the said reflective surface; in a circle with the central position of the said light exit surface as its center, at least a Fresnel annular surface and a surface are set up along the radius direction of the said light exit surface; the said light distribution camber is used for refracting the light incident on the said reflective surface to the said Fresnel annular surface and the said surface; the said reflective camber is used for reflecting the light incident on the said reflective camber to the said surface in collimation; the said Fresnel annular surface is used for reflecting the light incident on the said Fresnel annular surface through the said light distribution camber from the said light exit surface in collimation; the said surface is used for wholly reflecting the incident light through the said light distribution camber to the said reflective camber and for reflecting incident light through the said reflective camber from the said light exit surface in collimation.

17 Claims, 9 Drawing Sheets

KIND OF OPTICAL LENS AND A KIND OF MINER'S HELMET LAMP

The application specified herein was submitted to the China Patent Office on Jul. 13, 2012 with application number as 201210243822.3 and invention title as "A Kind of Optical Lens and A Kind of Miner's Helmet Lamp." The entire content of the China patent application priority is incorporated in this application through reference.

TECHNICAL FIELD

The present invention involves the field of optical device technology, in particular, a kind of optical lens and a kind of miner's helmet lamp.

BACKGROUND ART

Most condensing components currently used in miner's helmet LED lamps adopt parabola-shaped reflectors or total-reflection secondary optical lens to converge light emitted from LED.

Figure 1:
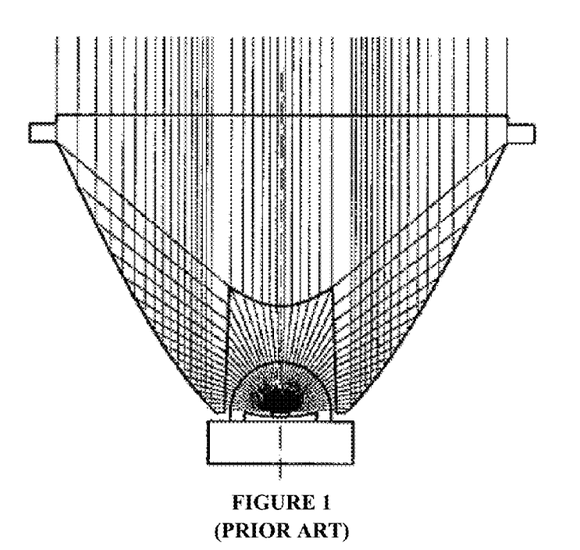
FIG. 1 is a structure diagram of a miner's helmet LED lamp in prior art.

For miner's helmet LED lamps using total-reflection secondary optical lens, as shown in FIG. 1, when a current lens with a diameter of 20 mm-30 mm is fitted with a 1-3 W LED with a 1 mm×1 mm chip, usually the minimal beam angle that can be obtained is about 8°-10°, which makes it impossible to produce an illuminance of 4,000-6,000 Lux at a distance of 1-3 meters. In order to meet the said illuminance requirement, usually at least 3 to 4 LEDs are needed, which makes it fast for batteries to be used up when the lamps operate for a long period of time. For a single LED, to meet the said illuminance requirement, its beam angle has to be kept below 5°. Nevertheless, to realize a beam angle below 5°, the diameter of the lens has to be increased to more than 50 mm-60 mm. If the total-reflection lens structure as shown in FIG. 1 is adopted, the thickness of the lens will have to be greatly increased. In such a case, the lens will have a large shrinkage during the process of injection molding, making injection molding very difficult to realize. Moreover, with the increase of the thickness of the lens, the weight of the lens will be increased greatly as well.

Therefore, at present, a kind of optical lens that can output beams at a narrow angle is urgently needed.

SUMMARY OF INVENTION

The embodiments of the present invention provide a kind of optical lens and a kind of miner's helmet lamp, which can output beams at a narrow angle.

To solve the aforesaid technical problems, the following technical solutions are adopted in the embodiments of the present invention:

A kind of optical lens, comprising a reflective surface and a light exit surface; wherein, in a circle with the central position of the said reflective surface as its center, at least a light distribution camber and a reflective camber are set up along the radius direction of the said reflective surface; in a circle with the central position of the said light exit surface as its center, at least a Fresnel annular surface and a surface are set up along the radius direction of the said light exit surface;

The said light distribution camber is used for refracting the light incident on the said reflective surface to the said Fresnel annular surface and the said surface;

The said reflective camber is used for reflecting the light incident on the said reflective camber to the said surface in collimation;

The said Fresnel annular surface is used for reflecting the light incident on the said Fresnel annular surface through the said light distribution camber from the said light exit surface in collimation;

The said surface is used for wholly reflecting the incident light through the said light distribution camber to the said reflective camber and for reflecting incident light through the said reflective camber from the said light exit surface in collimation.

Further, there is a first convex surface in the central position of the said reflective surface and a second convex surface in the central position of the said light exit surface; the said first convex surface and the said second convex surface meet the conditions for Kohler illumination.

Further, the distribution of the light incident on the said light distribution camber by the said light distribution camber meets the following tangent conditions:

$$\theta 2 = \tan^{-1}\left(\frac{\theta 1}{90} \cdot \tan \theta\right)$$

Wherein, θ1 is the angle between the light incident on the said light distribution camber and the central optical axis of the said optical lens; θ2 is the angle between the light incident on the said light distribution camber refracted from the said light distribution camber and the central optical axis of the said optical lens; θ is the angle between the periphery of the said surface to the central position of the reflective surface of the said optical lens and the central optical axis of the said optical lens.

Further, the said θ is 65°.

Further, there is a roof prisms array on the said reflective camber; the said roof prisms array is centered on the central position of the said reflective surface and arranged rotationally in a 360 degree; the said roof prisms array is used for reflecting the light incident on the said reflective camber to the said surface in collimation.

Further, the said roof prisms are of a right-angled V-shaped groove structure; the light incident on the said roof prisms is wholly reflected to the two sides of the said right-angled V-shaped groove structure and then incident on the said surface in collimation; the cross section of the said right-angled V-shaped groove structure is a right-angled triangle; the vertex of the right angle is located at the said reflective camber and the two edges of the right angle are located on the two sides of the said right-angled V-shaped groove structure.

Further, the angular spacing between the two adjacent roof prisms is 0.5°-10°.

Optimally, the angular spacing between the two adjacent roof prisms is 1°.

A kind of miner's helmet lamp, comprising any optical lens described above and a light source component.

Further, the said light source component is a single LED lamp.

The optical lens in the embodiments of the present invention as set up above can shoot out the light emitted from the light source component in collimation and form focusing faculae, thus realizing the output of beams at a narrow angle. Moreover, this optical lens is thin and light with a large diameter.

DESCRIPTION OF ATTACHED DRAWINGS

To describe the technical solutions adopted in the embodiments of the present invention or the prior art more clearly, the following is a brief introduction to the drawings needed in the description of the embodiments or the prior art. Obviously, the drawings described below are only some embodiments of the present invention, and persons of ordinary skill in the art are able to obtain other drawings based on these drawings without creative work.

FIG. 3b is a bottom view of the optical lens in the embodiment shown in FIG. 3a;

FIG. 3c is a vertical view of the optical lens in the embodiment shown in FIG. 3a;

FIG. 3d is an equiaxial side view of the optical lens in the embodiment shown in FIG. 3a;

FIG. 4 is a light path drawing of the first convex surface and the second convex surface in the embodiment shown in FIG. 3a;

FIG. 5 is a light distribution diagram of the light distribution camber in the embodiment shown in FIG. 3a;

FIG. 6 is a diagram of relationship between θ2 and θ1 of the light distribution camber in the embodiment shown in FIG. 3a;

FIG. 7 is a diagram of light path through the Fresnel annular surface and the surface in the embodiment shown in FIG. 3a;

FIGS. 8a-8b are diagrams of total reflection of light in roof prisms in the embodiment shown in FIG. 3a;

SPECIFIC EMBODIMENTS

To enable technical personnel in this art to further understand the characteristics and technical contents of the present invention, please refer to the description of the present invention and drawings below. The drawings are for reference and description only and should not be used for confining the present invention.

Below is a description of the technical solutions adopted in the present invention in light of the drawings and embodiments.

Figure 2:
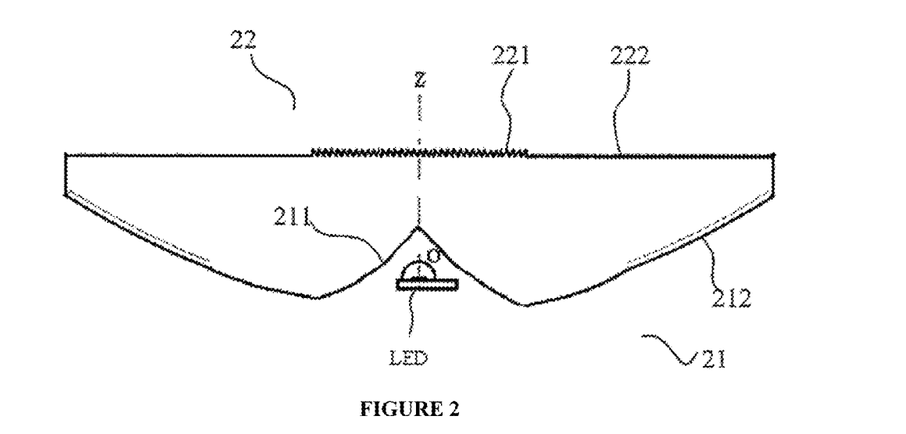
FIG. 2 is a sectional drawing of a kind of optical lens in an embodiment of the present invention.

Refer to FIG. 2, which a sectional drawing of a kind of optical lens in an embodiment of the present invention.

This optical lens comprises reflective surface 21 and light exit surface 22; wherein, in a circle with the central position of the reflective surface 21 as its center, at least a light distribution camber 211 and a reflective camber 212 are set up along the radius direction of the reflective surface 21; in a circle with the central position of the light exit surface 22 as its center, at least a Fresnel annular surface 221 and a surface 222 are set up along the radius direction of the light exit surface 22.

The light distribution camber 211 is used for refracting the light incident on the reflective surface 21 to the Fresnel annular surface 221 and the surface 222; the reflective camber 212 is used for reflecting the light incident on the reflective camber 212 to the surface 222 in collimation; the Fresnel annular surface 221 is used for reflecting the light incident on the Fresnel annular surface 221 from the light exit surface 22 in collimation; the surface 222 is used for wholly reflecting the incident light through the light distribution camber 221 to the reflective camber 212 and for reflecting incident light through the reflective camber 212 from the light exit surface 22 in collimation. Because the light undergoes folded total reflection (from the surface 222 and the reflective camber 212) in the lens twice, a relatively long focus can be realized within a relatively thin space, so that the faculae reflected from the lens can be produced at a narrow angle.

The light emitted from the light source component passes through the light distribution camber 211 on the reflective surface 21 of the optical lens first. After being reflected from the light distribution camber 211, it is incident on the Fresnel annular surface 221 and the surface 222. The light incident on the Fresnel annular surface 221 and the surface 222 is reflected from the light exit surface 22 in collimation; the light incident on the surface 222 meets the requirements for total reflection [from the surface 222] and therefore is wholly reflected to the reflective camber 212. The light incident on the reflective camber 212 is reflected [from the reflective camber 212] in collimation and then is reflected through the surface 222 from the light exit surface 22.

The optical lens in the embodiment of the present invention as set up above enables the light to undergo folded reflection inside the lens twice. It folds a long optical path in a relatively thin space, and can produce the light emitted from the light source component in collimation forming focusing faculae. Because the focus of the optical lens in the embodiment of the present invention is longer than the focus of the lens adopting prior art (only one total reflection) as shown in FIG. 1, according to the law that size of the beam angle (full angle 2θ) produced by this optical lens is $$2\theta = 2 \cdot \tan^{-1}\left(\frac{D}{2f'}\right),$$

it delivers beams at a narrow angle. This optical lens is thin and light with a large diameter. In the formula, D is the length of the diagonal line of the light-emitting surface of the chip and f is the focus of the lens. Assuming that the length of the diagonal line of the light-emitting surface of the LED chip is √2 mm, when the focus f is longer than 16.2 mm, the angle of the emitted beam is smaller than 5°.

Figure 3A:
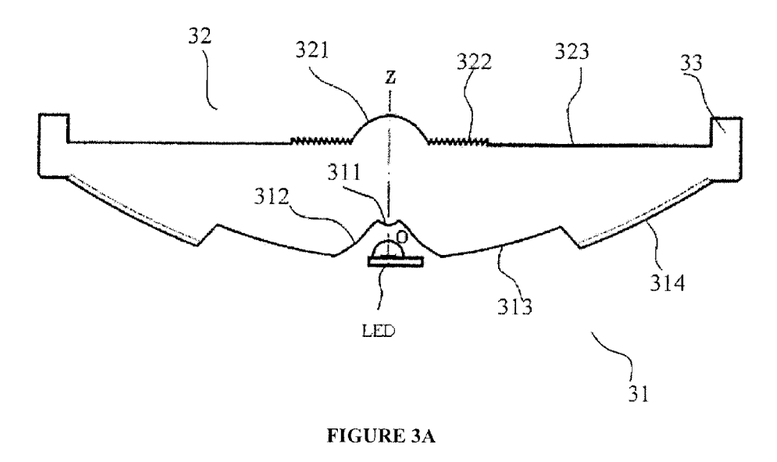
FIG. 3a is a sectional drawing of a kind of optical lens in an embodiment of the present invention.
Figure 3B:
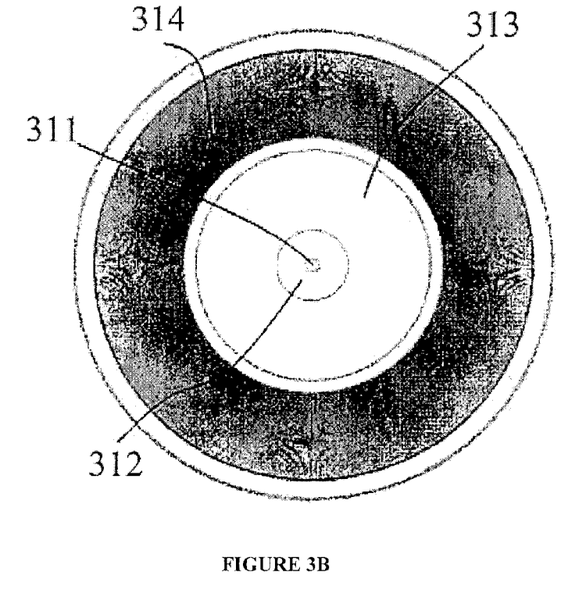
Figure 3C:
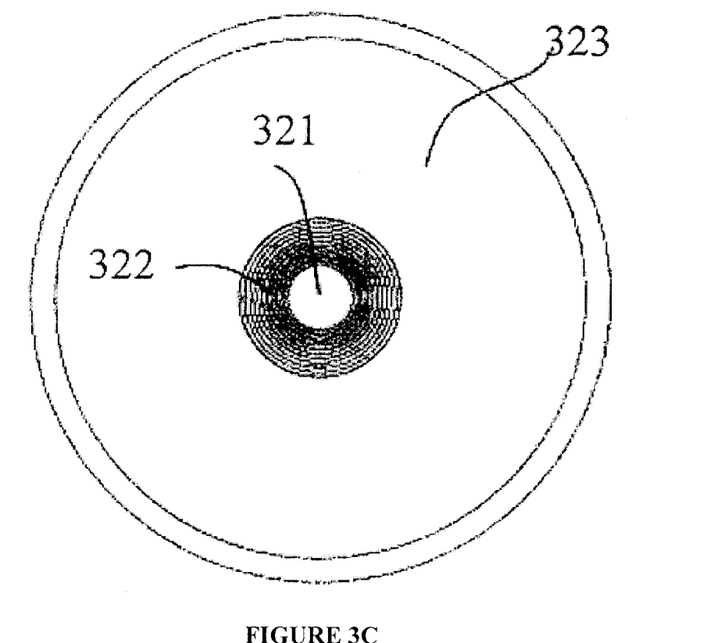
Figure 3D:
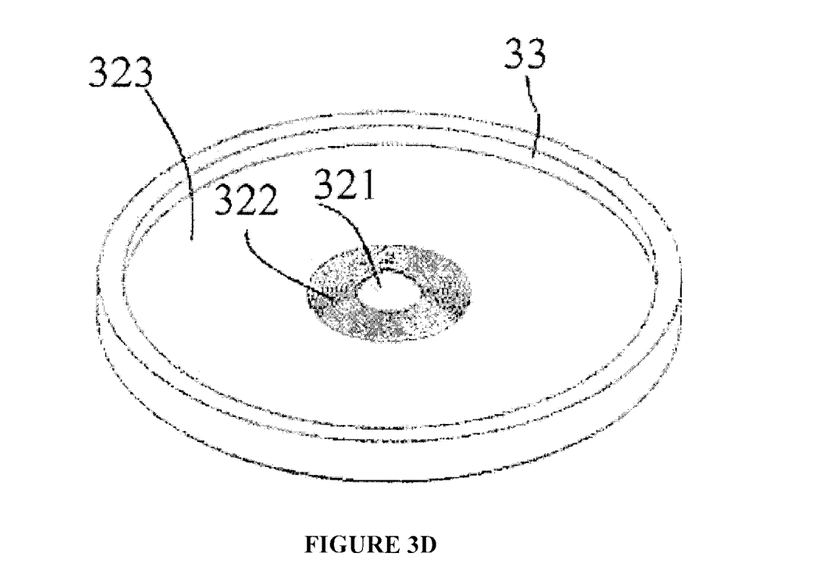

Refer to FIG. 3a, which is a sectional drawing of a kind of optical lens in an embodiment of the present invention; FIG. 3b is a bottom view of the optical lens; FIG. 3c is a vertical view of the optical lens; FIG. 3d is an equiaxial side view of the optical lens.

In this embodiment, the optical lens is a circular lens and comprises reflective surface 31 and light exit surface 32. As shown in FIGS. 3a and 3b, the reflective surface comprises the first convex surface 311, light distribution camber 312, transition camber 313 and reflective camber 314. As shown in FIGS. 3a, 3c and 3d, the light exit surface comprises the second convex surface 321, Fresnel annular surface 322 and surface 323. Flange 33, which is used for fixing other devices, can be set up at the periphery of the reflective surface and the light exit surface. It has no impact on optics and may assume any shape.

The first convex surface 311 is located in the central position of the reflective surface 31 of the optical lens, and is used for collecting the light emitted from LED chip and converging the light onto the vertex of the second convex surface 321. The light distribution camber 312 is a rotary cambered surface centered at the central position of the reflective surface 31 and revolving round the first convex surface 311, and is used for evenly distributing the light emitted from LED chip to the Fresnel annular surface 322 and the surface 323. The transition camber 313 is a non-optical surface and a rotary cambered surface revolving round the light distribution camber 312 or a camber or conical surface of other kinds. The reflective camber 314 is a rotary cambered surface centered at the central position of the reflective surface 31 and revolving round the transition camber 314, and is used for reflecting the light incident on the reflective camber 314 to the surface 323 in collimation.

The second convex surface 321 is located at the central position of the light exit surface 32 and opposite to the first convex surface 311. It is used for reflecting the light converged at the vertex of the second convex surface 321. The Fresnel annular surface 322 is centered at the central position of the light distribution surface 32. It revolves round the second convex surface 321 and is used for reflecting the incident light distributed by the light distribution camber 312 in collimation. The surface 323 is centered at the central position of the light distribution surface 32. It revolves round the Fresnel annular surface 322 and is used for wholly reflecting the incident light distributed by the light distribution camber 312 to the reflective camber 314.

Figure 4:
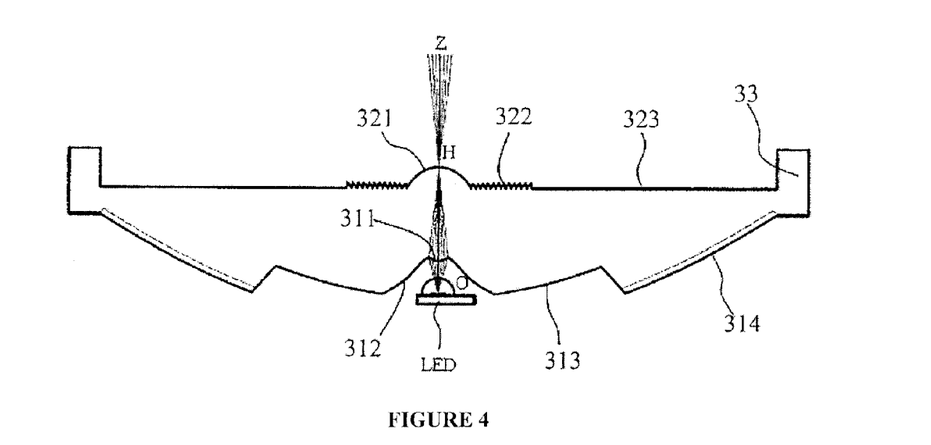

Wherein, the first convex surface 311 is right in the center of the reflective surface. The first convex surface 311 coincides with the focal plane of the second convex surface 321 on the light exit surface. The first convex surface 311 and the second convex surface 321 meet the conditions for Kohler illumination, that is, the first convex surface 311 forms the image of the light-emitting surface of LED chip at the vertex H of the second convex surface 321, and the shape of the optical pupil of the first convex surface 311 is projected to a distant place through the second convex surface 321. As shown in FIG. 4, the light emitted from the central position O of the light-emitting surface of LED chip at a smaller angle with the optical axis OZ of the optical lens (the optimal maximum angle between the light and the optical axis OZ is ±15° in the present invention) is collected by the first convex surface 311. It is then refracted and focused at the vertex H of the second convex surface 321 before being projected outward. The shape of the faculae reflected from the second convex surface 321 is that of the aperture of the first convex surface 311, which is round. The setup of the said first convex surface 311 and the second convex surface 321 avoids square faculae reflected due to the shape of the chip. As for the faculae reflected from the second convex surface 321, the tangent value of the semi-angle of their beams is equal to the ratio of the half of the aperture of the convex surface 11 to the focus of the convex surface 321, which is within the range of ±10°-20°. The optimal beam angle here is ±15°. The beams reflected from the first convex surface 311 and the second convex surface 321 are used as ambient light.

Figure 5:
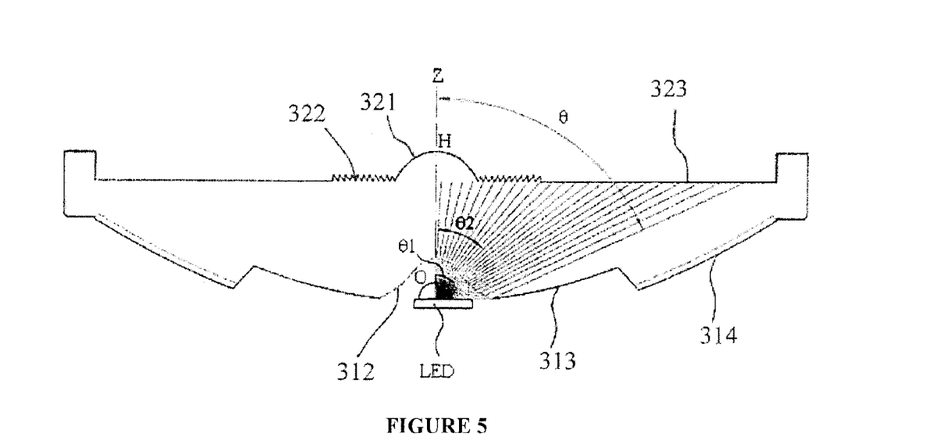

The light distribution camber 312 distributes the part of light emitted from the central position O of the light-emitting surface of LED chip and forming a big angle with the optical axis OZ of the optical lens (the optimal maximum angle between this part of light and the optical axis OZ is ±15°-±90° in the present invention), and the distributed beams are incident on the Fresnel annular surface 322 and the surface 323 at the vertex of the optical lens. As shown in FIG. 5, to facilitating the explanation of the light distribution principle of the light distribution camber 312, assuming that the light distribution camber 312 extends to OZ axis, i.e. the first convex surface 311 in the middle is ignored, the angle between the light emitted from LED and the optical axis OZ is θ1, and after light distribution by the light distribution camber 312, the angle between the refracted light and the optical axis OZ is θ2 (light distribution angle), then when θ1 varies between 0° and 90°, the light distribution at θ2 meets the following tangent conditions:

$$\theta2 = \tan^{-1}\left(\frac{\theta1}{90} \cdot \tan\theta\right)$$

Of which, θ is the angle between the periphery of the surface 323 to the center O of the light-emitting surface of LED chip (or the central position of the reflective surface) and OZ axis.

The main purpose of satisfaction of the said tangent conditions is to relatively evenly distribute 0-90° beams emitted from LED at the aperture occupied by the surface 323.

In this embodiment, if the angle between the periphery of the surface 323 to the center O of the light-emitting surface of LED chip (or the central position of the reflective surface) and OZ axis is about 65°, the light distribution at θ2 meets the following tangent conditions:

$$\theta2 = \tan^{-1}\left(\frac{\theta1}{90°} \cdot \tan 65°\right)$$

Figure 6:
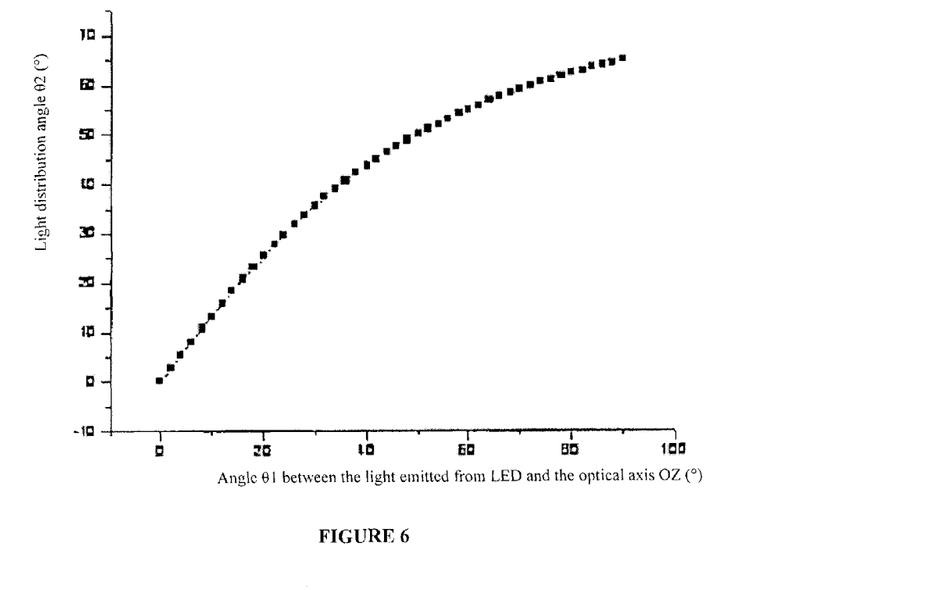

As shown in FIG. 6, when the light reflected from LED varies between 0° and 90°, the refracted light after light distribution by the light distribution camber 312 will be wholly distributed between 0° and 65° according to the aforesaid tangent conditions.

After light distribution by the light distribution camber 312, the beams are incident on the Fresnel annular surface 322 and the surface 323 on the light exit surface of the optical lens. Of which, the Fresnel annular surface 322 will directly reflect the light with a small incident angle in collimation, as shown in FIG. 7.

Figure 7:
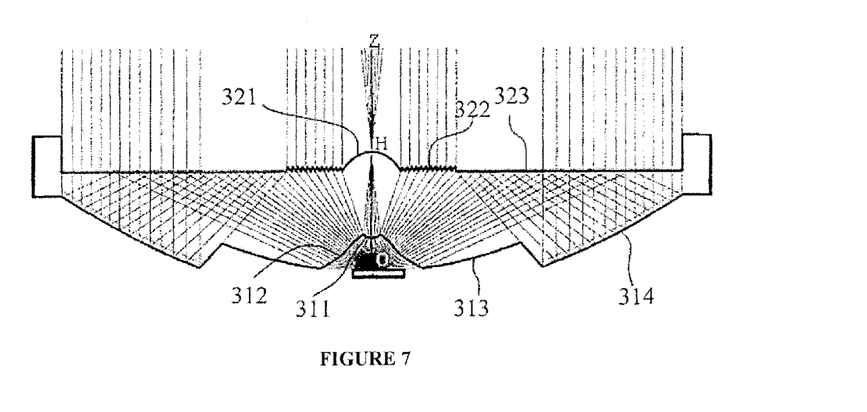

Since the remaining beams have a relatively big incident angle, the light that meets the conditions for total reflection will be wholly reflected by the surface 323, and then be incident on the reflective camber 314 at the bottom of the optical lens, and then be reflected by the reflective camber 314 and finally be reflected from the surface 323, as shown in FIG. 7. In another embodiment, a reflective coating can be put on the surface 323, to reflect the incident light to the reflective camber 314.

Of which, because the light incident on the reflective camber 314 has a relatively small incident angle and does not meet the conditions for total reflection, the reflective camber 314 needs to undergo certain technical process so that it can reflect the light to the surface 323

In the implementation of the embodiment, the reflective camber 314 may be plated with the reflective coating, so that this part of light will be reflected again and then be reflected from the surface 323 in collimation. However, the adoption of the plating process will increase the cost of production; in addition, the reflective coating is easily to come off in the adverse environment with strong alkaline and acid at mining areas.

Of course, other processes may be adopted to realize total reflection of the incident light by the reflective camber 314. For example, a micro-roof prisms array is set up at the reflective camber 314. These micro-roof prisms of the same structure are centered on the center O of the light-emitting surface of LED chip (or the central position of the reflective surface 31) and arranged rotationally in a 360 degree. The said roof prisms array is used for reflecting the light incident on the reflective camber 314 to the surface 323 in collimation. All the micro-roof prisms are of the same right-angled V-shaped groove structure. The light incident on the roof prisms is wholly reflected to the two sides of the right-angled V-shaped groove structure, then is incident on the surface 323 in collimation, and then is reflected from the surface 323 in collimation.

Figure 8A:
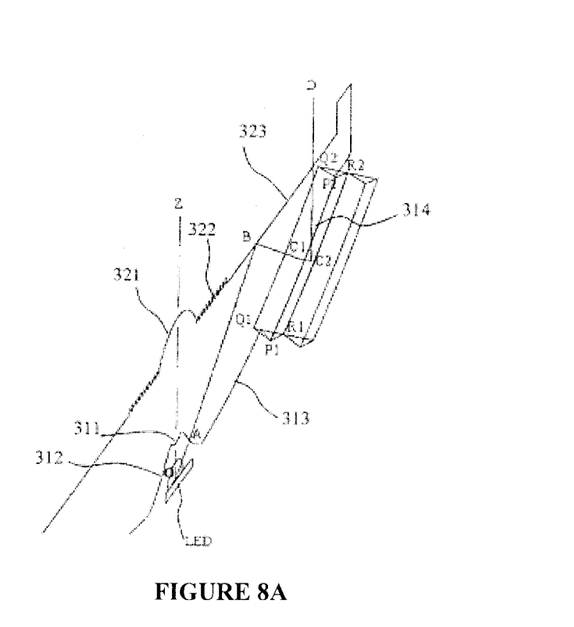
Figure 8B:
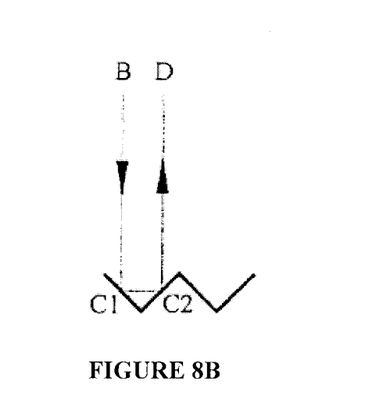

Refer to FIGS. 8a-8b for the principle of total reflection of the light in the micro-roof prisms. Take the example of a roof prism, the cross section of the right-angled V-shaped groove structure is a right-angled triangle; the vertex of the right angle is located at the reflective camber 314 and the two edges of the right angle are located on the two sides of the right-angled V-shaped groove structure. The contour of the section Q1P1R1 perpendicular to the V-shaped groove structure is a right-angled triangle, the included angle ∠Q1P1R1 at the bottom is a 90° right angle. Therefore, the light BC1 incident on the reflective camber 314 can undergo twice total reflections inside the roof prism of the right-angled V-shaped groove structure; first, the light will be wholly reflected by the first side P1Q1Q2P2 of the roof prism (the reflected light is C1C2); then, the light will be wholly reflected by the second side P1R1R2P2 of the roof prism (the reflected light is C2D); finally, this reflected light will be reflected from the surface 323 in collimation.

This roof prisms array can realize 100% total reflection in theory, without loss of optical energy. The angular spacing between the two adjacent micro-roof prisms may be 0.5°-10°. The angular spacing is that when the micro-roof prisms are arranged rotationally centered around the optical axis OZ, the angle formed between the ridge lines of two adjacent roof prisms revolving round the optical axis OZ. Optimally, the angular spacing between the two adjacent micro-roof prisms is 1° in the present invention.

Figure 9:
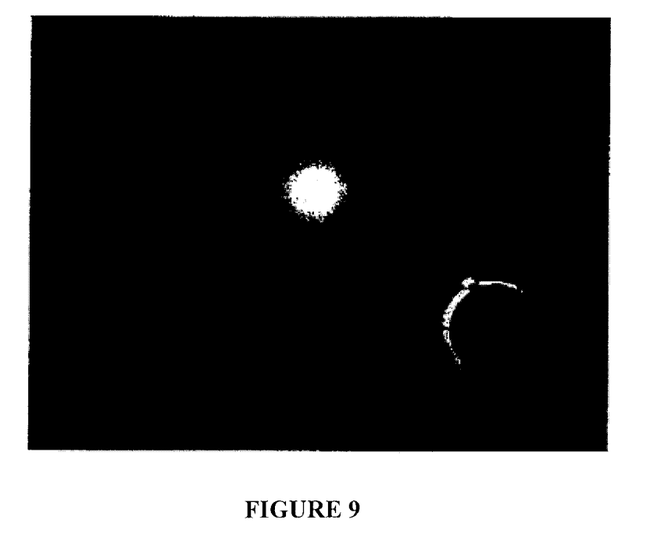
FIG. 9 shows images of faculae at 1 m away from a miner's helmet lamp equipped with an optical lens in an embodiment of the present invention.

FIG. 9 shows the image of faculae at 1 m away from a miner's helmet lamp equipped with an optical lens in an embodiment of the present invention. It can be seen from the Figure that the faculae are very clean and transited gently and do not have any stray light. The faculae comprise a very bright round facula in the center and a relatively dark round facula around the periphery of the bright facula. Of which, the very bright facula in the center is produced by the reflective camber 314 in which a micro-roof prisms array is set up. The relatively dark round facula around the periphery of the bright facula is produced by the first convex surface 311, the second convex surface 321 and the Fresnel annular surface 322 on the optical lens.

Figure 10:
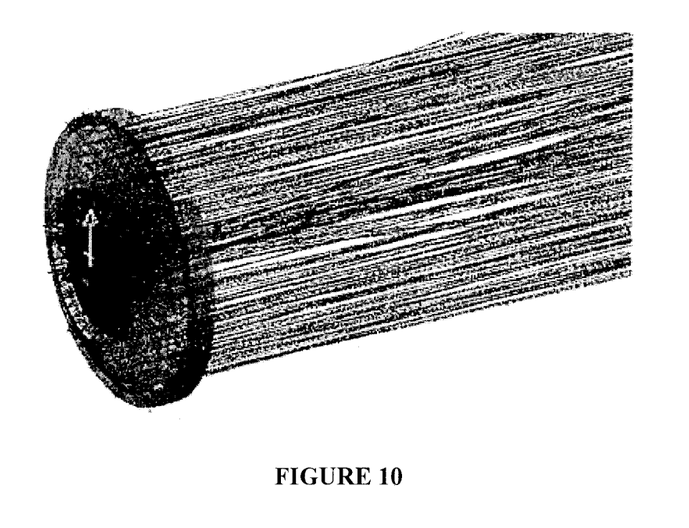
FIG. 10 is a ray tracing diagram of an optical lens in an embodiment of the present invention.
Figure 11:
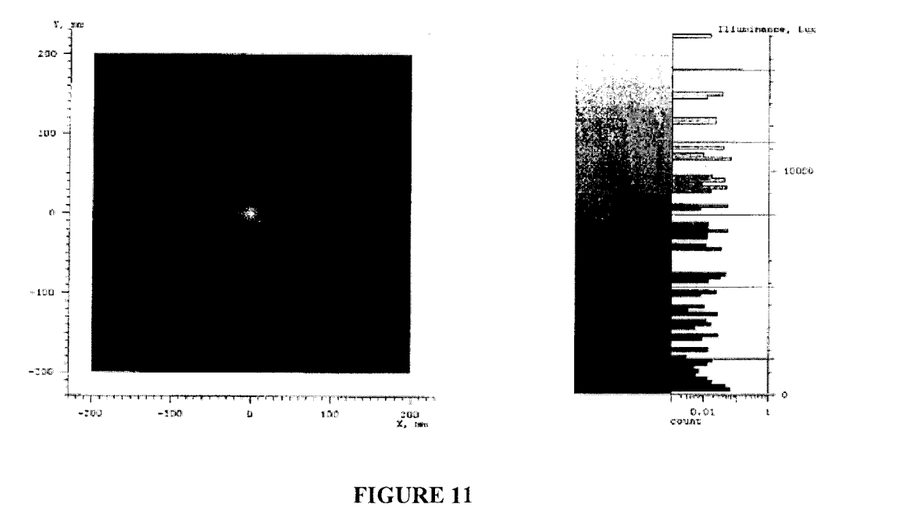
FIG. 11 is an illuminance distribution diagram at 1 m away from an optical lens in an embodiment of the present invention.

Below is the computer simulation of an optical lens in an embodiment of the present invention. Supposing LED is Philips's Luxeon Rebel DS56 LED and the flux of the single LED is 90 Lumen. FIG. 10 is a ray tracing diagram of an optical lens in an embodiment of the present invention. FIG. 11 is an illuminance distribution diagram at 1 m away. It can be seen from the diagrams that the faculae are round, about ϕ100 mm. The maximum illuminance on the screen is 16100.2187 Lux and the flux collected on the screen is 77.2796469135825820 Lumen. That is, the optical efficiency of the lens is:

$$\eta = 77.2796469135825820/90 \cdot 100\% = 85.8662743484250911111111111111111\%.$$

Figure 12:
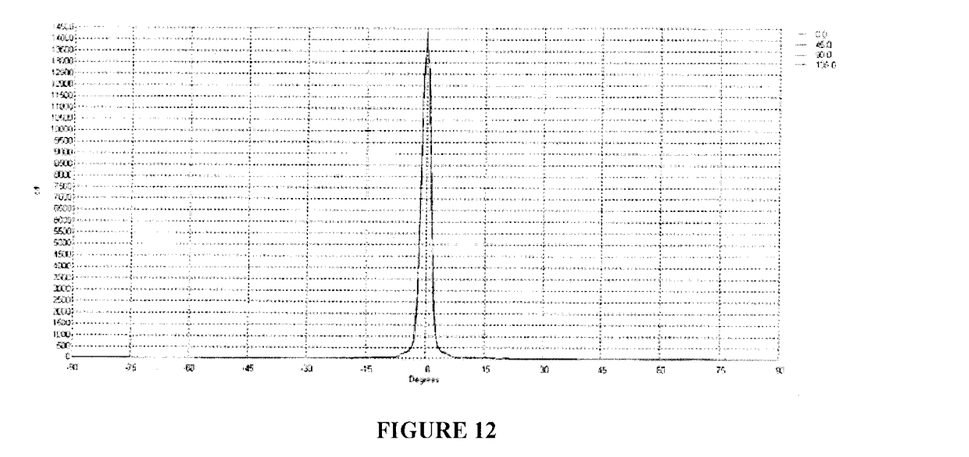
FIG. 12 is a diagram of far-field angular distribution of light intensity in an embodiment of the present invention.
Figure 13:
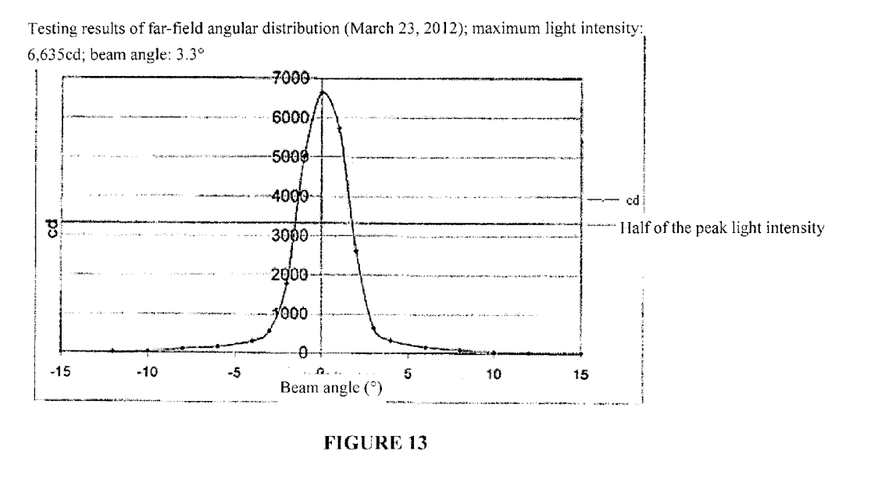
FIG. 13 is a diagram of actually tested light distribution curve of a miner's helmet lamp equipped with an optical lens in an embodiment of the present invention.

FIG. 12 is a diagram of far-field angular distribution of light intensity in an embodiment of the present invention, i.e. light distribution curve. The width of the beam angle at the half of the peak light intensity is about ±1.7°. FIG. 13 is a diagram of actually tested light distribution curve of a miner's helmet lamp equipped with an optical lens in an embodiment of the present invention. The regulated electric current is 105 mA. The full beam angle of the faculae measured at the half of the peak light intensity is about 3.3°.

By the adoption of the aforesaid structure, the optical lens in the embodiments of the present invention realizes output of beams at a narrow angle, and the lens is thin and light with a large diameter. A single LED lamp is good enough to meet the illuminance requirement and support long periods of operation. This optical lens does not need a reflective coating, as the reflective coating may easily come off, get rusty or corrode in the adverse environment with strong alkaline and acid.

The embodiments of the present invention also provide a kind of miner's helmet, which comprises a light source component and an optical lens fixed outside the light source component. The said light source component may be LED. The said optical lens may be any optical lens described in the aforesaid embodiments. Please refer to the aforesaid embodiments for details.

The embodiments of the present invention described above shall in no way confine the scope of protection for the present invention. Any modification or equivalent replacement or improvement made in the spirit and principle of the present invention shall be included in the scope of protection for the claims regarding the present invention.

The invention claimed is:
1. An optical lens comprising:
a reflective surface including, in a circle with the central position of the reflective surface as its center: a convex surface portion, a light distribution camber, a transition camber, and a reflective camber consecutively formed along the radius direction of the reflective surface; and
a light exiting surface including, in a circle with the central position of the light exiting surface as its center: a Fresnel annular surface and a surface formed along the radius direction of the light exiting surface, wherein:
the light distribution camber is configured to refract light incident on the reflective surface to the Fresnel annular surface and the surface;
the reflective camber is configured to reflect the light incident on the reflective camber to the surface in collimation;
the Fresnel annular surface is configured to refract the light incident on the Fresnel annular surface through the light distribution camber from the light exiting surface in collimation; and
the surface is configured to:
substantially wholly reflect the incident light through the light distribution camber to the reflective camber, and refract the incident light through the reflective camber from the light exiting surface in collimation,
wherein the distribution of the light incident on the light distribution camber by the light distribution camber meets the following tangent conditions:

$$\theta_2 = \tan^{-1}\left(\frac{\theta_1}{90} \cdot \tan\theta\right).$$

wherein θ1 is the angle between the light incident on the light distribution camber and the central optical axis of the optical lens; θ2 is the angle between the light incident on the light distribution camber refracted from the light distribution camber and the central optical axis of the optical lens; θ is the angle between the periphery of the surface to the central position of the reflective surface of the optical lens and the central optical axis of the optical lens.

2. The optical lens described in claim 1, wherein the light exiting surface further comprises a second convex surface portion in the central position of the light exiting surface; and wherein the first convex surface portion and the second convex surface portion meet the conditions for Kohler illumination.

3. The optical lens described in claim 2, wherein a convex surface of the first convex surface portion faces away from a convex surface of the second convex surface portion.

4. The optical lens described in claim 2, wherein a convex surface of the first convex surface portion faces a light source and a convex surface of the second convex surface portion faces away from the light source.

5. The optical lens described in claim 1, wherein said θ is 65°.

6. The optical lens described in claim 1, further comprising an array of roof prisms formed on the reflective camber, the array of roof prisms being centered on the central position of the reflective surface and arranged rotationally at 360 degree, wherein the array of roof prisms is configured to reflect the light incident on the reflective camber to the surface in collimation.

7. The optical lens described in claim 6, wherein:
at least one roof prism of said array of roof prisms includes a right-angled V-shaped groove structure;
the light incident on the at least one roof prism of said array of roof prisms is substantially wholly reflected to two sides of the right-angled V-shaped groove structure and then incident on the surface in collimation;
the cross section of the right-angled V-shaped groove structure is a right-angled triangle; and
the vertex of the right angle is located at the reflective camber and the two edges of the right angle are located on the two sides of the right-angled V-shaped groove structure.

8. The optical lens described in claim 6, wherein the angular spacing between two adjacent roof prisms of the array of roof prisms is 0.5°-10°.

9. The optical lens described in claim 8, wherein the angular spacing between the two adjacent roof prisms is 1°.

10. A miner's helmet lamp, comprising:
the optical lens described in claim 1; and
a light source component.

11. The miner's helmet lamp described in claim 10, wherein said light source component is a single LED lamp.

12. The optical lens described in claim 1, wherein:
the convex surface portion includes a convex surface facing away from the light exiting surface, light distribution camber being connected to the convex surface portion to form a first convex portion of the reflective surface;
the light distribution camber is connected to the transition camber to form a first concave portion of the reflective surface; and
the transition camber is connected to the reflective camber to form a second convex portion of the reflective surface, the reflective camber having a concave surface facing the light exiting surface.

13. The optical lens described in claim 1, wherein a convex surface of the first convex surface portion faces away from the light exiting surface.

14. The optical lens described in claim 1, wherein the reflective camber is positioned more radially outward along the radius direction of the reflective surface from the central position of the reflective surface than the convex surface portion.

15. The optical lens described in claim 1, wherein the transition camber is non-optical to a degree.

16. An optical lens comprising:
a reflective surface including, in a circle with the central position of the reflective surface as its center: a light distribution camber and a reflective camber along the radius direction of the reflective surface; and
a light exiting surface including, in a circle with the central position of the light exiting surface as its center: a Fresnel annular surface and a surface formed along the radius direction of the light exiting surface, wherein:
the light distribution camber is configured to refract the light incident on the reflective surface to the Fresnel annular surface and the surface;
the reflective camber is configured to reflect the light incident on the reflective camber to the surface in collimation;
the Fresnel annular surface is configured to refract the light incident on the Fresnel annular surface through the light distribution camber from the light exiting surface in collimation;
the surface is configured to:
substantially wholly reflect the incident light through the light distribution camber to the reflective camber, and
refract the incident light through the reflective camber from the light exiting surface in collimation; and
the distribution of the light incident on the light distribution camber by the light distribution camber meets the following tangent conditions:

$$\theta_2 = \tan^{-1}\left(\frac{\theta_1}{90} \cdot \tan\theta\right).$$

wherein θ1 is the angle between the light incident on the light distribution camber and the central optical axis of the optical lens; θ2 is the angle between the light incident on the light distribution camber refracted from the light distribution camber and the central optical axis of the optical lens; θ is the angle between the periphery of the surface to the central position of the reflective surface of the optical lens and the central optical axis of the optical lens.

17. The optical lens described in claim 16, wherein said θ is 65°.

* * * * *